United States Patent
Poisson et al.

(10) Patent No.: US 7,650,807 B2
(45) Date of Patent: Jan. 26, 2010

(54) METHOD FOR ADJUSTING AN AUTOMATIC TRANSMISSION RATIO

(75) Inventors: Carine Poisson, Montlhery (FR); Christian Taffin, Le Mesnil Saint Denis (FR)

(73) Assignee: Renault S.A.S., Boulogne Billancourt (FR)

( * ) Notice: Subject to any disclaimer, the term of this patent is extended or adjusted under 35 U.S.C. 154(b) by 436 days.

(21) Appl. No.: 10/590,814

(22) PCT Filed: Feb. 25, 2005

(86) PCT No.: PCT/FR2005/050127

§ 371 (c)(1),
(2), (4) Date: Jan. 16, 2007

(87) PCT Pub. No.: WO2005/085682

PCT Pub. Date: Sep. 15, 2005

(65) Prior Publication Data

US 2007/0254774 A1 Nov. 1, 2007

(30) Foreign Application Priority Data

Feb. 27, 2004 (FR) .................................. 04 50367

(51) Int. Cl.
*F16H 59/00* (2006.01)
*F16H 61/00* (2006.01)
*F16H 63/00* (2006.01)

(52) U.S. Cl. .................... 74/335; 74/336 R; 74/473.12; 74/473.18; 74/473.2; 74/473.21; 74/473.24; 74/473.3

(58) Field of Classification Search ............... 74/336 R, 74/335, 552, 553, 556, 473.1, 473.12, 473.18, 74/473.2, 473.21, 473.24, 473.3, 473.31, 74/473.33; 477/34, 97, 111, 115, 122
See application file for complete search history.

(56) References Cited

U.S. PATENT DOCUMENTS

| 5,662,549 | A  | * | 9/1997  | Kondo et al. ................. 477/122 |
| 5,819,585 | A  |   | 10/1998 | Darnell |
| 5,865,705 | A  | * | 2/1999  | Shamoto et al. ............... 477/79 |
| 6,044,317 | A  |   | 3/2000  | Taffin |
| 6,085,139 | A  |   | 7/2000  | Nakauchi et al. |
| 6,266,603 | B1 |   | 7/2001  | Taffin et al. |
| 6,692,408 | B2 | * | 2/2004  | Sato et al. .................... 477/129 |
| 2003/0101840 | A1 | * | 6/2003 | Yoshikawa et al. ............ 74/552 |

FOREIGN PATENT DOCUMENTS

| EP | 1 122 467 | 8/2001 |
| FR | 2737761 | 2/1997 |
| FR | 2741931 | 6/1997 |
| FR | 2772865 | 6/1999 |
| WO | 02/097308 | 12/2002 |

* cited by examiner

*Primary Examiner*—David D Le
(74) *Attorney, Agent, or Firm*—Oblon, Spivak, McClelland, Maier & Neustadt, L.L.P.

(57) ABSTRACT

A method for adjusting an automatic transmission ratio by a driver includes imposing a ratio change required by the driver to the transmission when first conditions are fulfilled, maintaining the ratio until second conditions for returning to operation in an automatic mode are fulfilled, and automatically restoring the automatic mode when the second conditions are fulfilled.

19 Claims, 1 Drawing Sheet

METHOD FOR ADJUSTING AN AUTOMATIC TRANSMISSION RATIO

BACKGROUND OF THE INVENTION

I. Field of the Invention

The present invention relates to the control of automatic transmissions with discrete or continuously variable ratios. They apply to all types of automatic or automated transmissions with discrete or continuously variable ratios.

When these transmissions have an automatic control mode and a manual control mode, the invention relates only to the automatic mode. The subject of the invention is the management of actions by the driver in automatic mode, and, to this end, it constitutes a method for adjusting the ratios of an automatic transmission, as opposed to the facilities for genuinely exiting from the automatic mode by the driver, when he wants to take full charge of the control of speed shifts, as in a manual transmission.

II. Description of Related Art

When a vehicle equipped with an automatic transmission has two transmission control arms on, or near, the steering wheel, the driver can, in theory, use these control arms (instead of a conventional control lever), to control up- or down-shifts in a so-called "pulsed manual control" mode.

According to the usual provision in the art, the driver must initially choose the option to exit from the automatic mode by setting a lever or knob to the appropriate position. He can then control up- and down-shifts by successive presses on the (+) arm and on the (−) arm. In these conditions, if the driver has chosen to exit from the automatic mode for the manual mode, he has taken control of the changes of ratio, until deliberately initiating a return to automatic mode, which he does by returning the lever or knob to the appropriate position.

With this known control principle, if the driver forgets to return to the automatic mode after temporarily wishing to take control of the changes of ratio, he remains, despite himself, in manual mode.

BRIEF SUMMARY OF THE INVENTION

The invention proposes a different mode of operation, according to which the changes of ratio requested by the driver are imposed on the transmission if first conditions are satisfied. A ratio adjusted in this way is maintained until second conditions for returning to automatic mode are satisfied, and the automatic mode is automatically restored when the second conditions are satisfied.

With these measures an adjustment, or up- or down-shift "override", can be directly imposed on the transmission when the requisite conditions are satisfied, without actually exiting from the automatic mode, since the latter is automatically restored when circumstances permit.

Preferably, the adjustments requested by the driver will take priority over complementary functions, such as ratio blocking on lifting the foot, or down-shifting on braking.

According to a particular embodiment of the invention, the action means are arms disposed near to the steering wheel, or on the steering wheel.

BRIEF DESCRIPTION OF THE DRAWINGS

The present invention will be better understood from reading the following description of a non-limiting embodiment of the latter, by referring to the appended drawing, in which.

DETAILED DESCRIPTION OF THE INVENTION

Figure 1:
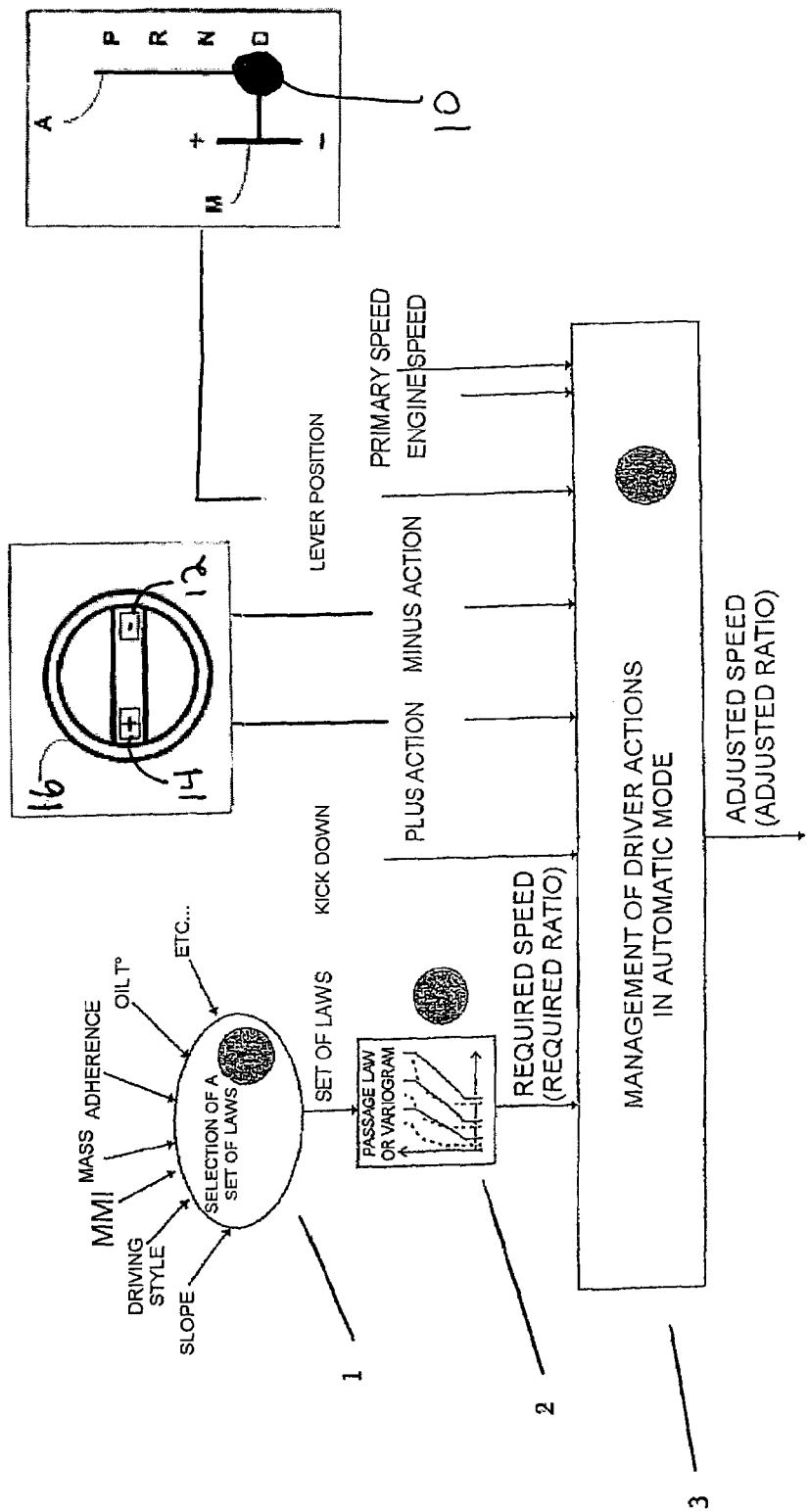
FIG. 1 illustrates the method proposed by the invention.

FIG. 1 summarizes, in a simplified way, the proposed control method that makes it possible to take into account and process the actions of the driver in automatic mode to request a higher or lower ratio. Thus, as explained below, the driver can manually change the ratio when the gearshift 10 is in an automatic mode. The gearshift 10 can be positioned in an automatic gearshift slot A and be moved between one of the automatic positions, such as park (P), reverse (R), neutral (N), or drive (D). Alternatively, the gearshift 10 can be positioned in a manual gearshift slot M and be moved to a plus position (+) and a minus (−) in a manual mode.

The block 1 determines the type of set of shift laws (for transmissions with discrete ratios) or the type of variogram (for transmissions with continuously variable ratios) according to a certain quantity of information representative of the environment, of the drive train, of the driver, and of his driving actions.

In this block, the selection of a set of shift laws, or of variograms, is made according to the driving style, the gradient of the road, road grip, or even driver requests expressed by means of buttons (snow, sport, etc.), or even according to operating characteristics of the drive train, such as transmission oil temperature.

When a number of sets of shift laws (or variograms in the case of continuously variable ratio transmissions) are associated with the determination of the driving style, the block 1 can, for example, make its choice by applying a method described in publication FR 2 741 931.

Similarly, when a number of sets of shift laws (or variograms in the case of continuously variable ratio transmissions) are associated with the determination of the gradient of the road (upward and downward), the gradient of the road can also be determined and taken into account in the block 1, according to the teaching of publication FR 2 737 761.

In the case where one or more sets of shift laws (or variograms in the case of continuously variable ratio transmissions) are associated with the determination of the road grip, the latter can also be taken into account in the block 1, according to a known method such as that of publication FR 2 772 865.

Finally, as indicated in FIG. 1, the block 1 can also take into consideration the temperature of the oil, in the case where one or more sets of shift laws (or variograms in the case of continuously variable ratio transmissions) are associated with the protection of the drive train (engine or gearbox), according to the temperature of the engine oil, for example.

In these conditions, a set of shift laws (or variograms in the case of continuously variable ratio transmissions) is selected in the block 1, to best satisfy the wishes of the driver, taking into account the driving situation.

The block 2 corresponds to a module for determining the transmission ratio according to the speed of the vehicle and the engine load (the engine load can, depending on configurations, be the accelerator pedal, a quantity representative of the request by the driver expressed as power or torque, or even the aperture of the engine fuel inlet control device). In this block, conventional operating curves are used to determine the required ratio set-point which should be applied to the transmission.

According to the invention, this ratio set-point can be adjusted to take account of the actions of the driver to request an up-shift "plus action" or a down-shift "minus action". For example, the up-shift and down-shift can be requested by the driver pressing acuation devices on the steering wheel 16. The actuation devices can be arms (for example plus arm 14 and minus arm 12) located on or near the steering wheel 16.

Finally, the object of the block 3 is to propose an adjustment of the ratio that has been determined by the block 2 by taking into account any actions of the driver, "plus action" (up-shift request) or "minus action" (down-shift request), and other information needed to manage the ratio adjustment effectively. According to the invention, the information taken into account in the block 3 is, in a non-limiting way:

"plus action" (up-shift request by the driver),
"minus action" (down-shift request by the driver),
engine load,
primary speed (i.e. the speed of the primary or input shaft of the transmission),
engine speed,
kick down information,
gearshift lever position information.

According to the invention, when an up-shift request is made by the driver, this request is processed as follows. If the activation conditions below are satisfied:

plus action=1, and
primary speed>threshold (not currently under-speed), and
lever position=Drive (not currently in Neutral, Park or Reverse), and
kick down=0 (driver does not request a kick down), and
required ratio<maximum ratio allowed by the transmission, then an up-shift is imposed: adjusted ratio=required ratio+1.

The conditions for returning to automatic mode following the up-shift that has just been made are then:

minus action=1 (down-shift request), or
primary speed<threshold (currently under-speed), or
engine speed>threshold (currently over-speed), or
lever position≠Drive (currently in Neutral, Park or Reverse), or
kick down=1 (driver requests a kick down), or
timer timed out (to remain in adjustment mode for a minimum time), or
required ratio=adjusted ratio (the automatic mode requests the same ratio as the driver).

Similarly, down-shift requests by the driver may be processed as follows. When the activation conditions below are satisfied:

minus action=1, and
primary speed<threshold (to avoid an over-speed), and
lever position=Drive (not currently in Neutral, Park or Reverse), and
kick down=0 (driver does not request a kick down), and
required ratio>minimum ratio allowed by the transmission, then a down-shift is imposed: adjusted ratio=required ratio−1.

The conditions for returning to automatic mode following the down-shift that has just been made are then:

plus action=1 (up-shift request), or
primary speed<threshold (currently under-speed), or
engine speed>threshold (currently over-speed), or
lever position not Drive (currently in Neutral, Park or Reverse), or
kick down=1 (driver requests a kick down), or
timer timed out (to remain in adjustment mode for a minimum time), or
required ratio=adjusted ratio (the automatic mode requests the same ratio as the driver).

Finally, according to another characteristic of the invention, in the case where the automatic transmission has complementary functions such as "ratio blocking on lifting the foot", "down-shifting on braking", or any other function of this type, then the adjustments made at the request of the driver in the conditions indicated above will preferably take priority over the complementary functions.

There are many advantages of the invention. Compared to the so-called pulsed manual control mode, the "overriding" of the shifts that is performed in automatic mode provides a way of taking into account the requests of the driver (+ action or − action), while remaining in this automatic mode.

This method provides for a far more comfortable drive than the conventional pulsed manual mode, because the driver can change ratio in automatic mode as required, and when he stops acting on the ratio decisions, then the conventional automatic mode is restored, and the transmission ratio changes are made automatically.

The invention claimed is:

1. A method for adjusting automatic transmission ratios by a driver, comprising:
controlling the automatic transmission ratios according to operating curves in an automatic mode;
while a gearshift lever of a transmission is maintained in a position corresponding to the automatic mode, imposing a change of ratio requested by the driver on the transmission, if first conditions are satisfied, wherein the change of ratio requested by the driver is manually imposed in the automatic mode;
maintaining the ratio requested by the driver until second conditions for returning to the controlling the automatic transmission ratios according to the operating curves in the automatic mode are satisfied; and
automatically restoring the controlling in the automatic mode when the second conditions are satisfied.

2. The adjustment method as claimed in claim 1, wherein the driver can request an up-shift or a down-shift by use of separate action devices.

3. The adjustment method as claimed in claim 1, wherein information taken into account to perform an adjustment includes:
ratio required by the transmission, and
up- and down-shift requests by the driver, and
engine load, and
primary speed, and
engine speed, and
kick down information, and
gearshift lever position information.

4. The adjustment method as claimed in claim 1, wherein adjustments take priority over complementary functions, or ratio blocking on lifting a foot of the driver, or down-shifting on braking.

5. The adjustment method as claimed in claim 1, wherein the first conditions do not include changing the position of the gearshift lever to correspond to a manual mode.

6. The adjustment method as claimed in claim 1, wherein the gearshift lever is configured to be switched between a park position, a reverse position, a neutral position, and a drive position, and the transmission is in the automatic mode when the gearshift lever is switched to the drive position.

7. The adjustment method as claimed in claim 1, wherein the ratio requested by the driver is different from a required-ratio set-point determined from the operating curves for the transmission in the automatic mode.

8. The adjustment method as claimed in claim 1, wherein the first conditions comprise conditions for imposing an up-shift on the transmission when requested by the driver include:
primary speed>threshold, and lever position=Drive, and
kick down=0, and
required ratio<maximum ratio allowed by the transmission.

9. The adjustment method as claimed in claim 8, wherein the automatic mode is restored following the imposed up-shift when:
a down-shift request is made by the driver, or
primary speed<threshold, or
engine speed>threshold, or
lever position≠Drive, or
kick down=1, or
timer timed out, or
ratio required by transmission=adjusted ratio.

10. The adjustment method as claimed in claim 9, wherein the position of the gearshift lever does not have to be changed for the automatic mode to be restored following the imposed up-shift.

11. The adjustment method as claimed in claim 1, wherein the first conditions comprise conditions for imposing a down-shift on the transmission when requested by the driver include:
primary speed<threshold, and
lever position=Drive, and
kick down=0, and
required ratio>minimum ratio allowed by the transmission.

12. The adjustment method as claimed in claim 11, wherein the automatic mode is restored following the imposed down-shift when:
an up-shift request is made by the driver, or
primary speed<threshold, or
engine speed>threshold, or
lever position≠Drive, or
kick down=1, or
timer timed out, or
ratio required by transmission=adjusted ratio.

13. The adjustment method as claimed in claim 12, wherein the position of the gearshift lever does not have to be changed for the automatic mode to be restored following the imposed down-shift.

14. An adjustment device for adjusting automatic transmission ratios, comprising:
a plurality of blocks configured to control the automatic transmission ratios according to operating curves in an automatic mode, manually impose a change of ratio requested by a driver on a transmission while a gearshift lever of the transmission is maintained in a position corresponding to the automatic mode if first conditions are satisfied, maintain the ratio requested by the driver until second conditions for returning to the control of the automatic transmission ratios according to the operating curves in the automatic mode are satisfied, and automatically restore the control in the automatic mode when the second conditions are satisfied; and
separate action devices with which the driver can request an up-shift or a down-shift, and the up-shift or the down-shift requested by the driver is imposed in the automatic mode,
wherein the separate action devices include arms disposed near to a steering wheel.

15. The adjustment device as claimed in claim 14, wherein the first conditions do not include changing the position of the gearshift lever to correspond to a manual mode.

16. The adjustment device as claimed in claim 14, wherein the ratio requested by the driver is different from a required-ratio set-point determined from the operating curves for the transmission in the automatic mode.

17. The adjustment device for adjusting automatic transmission ratios, comprising:
a plurality of blocks configured to control the automatic transmission ratios according to operating curves in an automatic mode, manually impose a change of ratio requested by a driver on a transmission while a gearshift lever of the transmission is maintained in a position corresponding to the automatic mode if first conditions are satisfied, maintain the ratio requested by the driver until second conditions for returning to the control of the automatic transmission ratios according to the operating curves in the automatic mode are satisfied, and automatically restore the control in the automatic mode when the second conditions are satisfied; and
separate action devices with which the driver can request an up-shift or a down-shift, and the up-shift or the down-shift requested by the driver is imposed in the automatic mode,
wherein the separate action devices include arms disposed on a steering wheel.

18. The adjustment device as claimed in claim 17, wherein the first conditions do not include changing the position of the gearshift lever to correspond to a manual mode.

19. The adjustment device as claimed in claim 17, wherein the ratio requested by the driver is different from a required-ratio set-point determined from the operating curves for the transmission in the automatic mode.

* * * * *